United States Patent [19]

Jauvtis

[11] 3,786,449

[45] Jan. 15, 1974

[54] MAGNETIC THIN FILM SHIFT REGISTER HAVING BIDIRECTIONAL TRANSMISSION ELEMENTS AND OFFSET BLOCK SITES

[75] Inventor: Harvey I. Jauvtis, Arlington, Mass.

[73] Assignee: Cambridge Memories, Inc., Newton, Mass.

[22] Filed: May 1, 1972

[21] Appl. No.: 249,082

[52] U.S. Cl.340/174 FB, 340/174 AC, 340/174 ZB, 340/174 TF

[51] Int. Cl. .......................... G11c 19/00, G11c 11/14

[58] Field of Search ............... 340/174 FB, 174 AC, 340/174 MC, 174 ZB, 174 TF

[56] References Cited

UNITED STATES PATENTS

| | | | |
|---|---|---|---|
| 3,438,016 | 4/1969 | Spain | 340/174 FB |
| 3,656,126 | 4/1972 | Jauvtis | 340/174 FB |
| 3,562,722 | 2/1971 | Jauvtis | 340/174 FB |

*Primary Examiner*—Stanley M. Urynowicz, Jr.
*Attorney*—Melvin R. Jenney et al.

[57] ABSTRACT

A digital shift register propagating information as discrete regions of reverse magnetization has a bidirectional transmission pa1th and has means for producing magnetic fields both continuously along the transmission path and only at selected sites along the path. Domain-blocking fields are produced at sites along the path offset uniformly from domain-holding locations by less than one-half the spacing between adjacent hold locations. In each domain-propagating step, the block fields are produced offset from the propagate fields by a time corresponding to the spatial offset.

13 Claims, 4 Drawing Figures

MAGNETIC THIN FILM SHIFT REGISTER HAVING BIDIRECTIONAL TRANSMISSION ELEMENTS AND OFFSET BLOCK SITES

BACKGROUND OF THE INVENTION

This invention relates to a digital register for storing and shifting information in the form of discrete regions of unique magnetization. In particular, the invention provides a magnetic thin film shift register employing a bidirectional magnetic transmission path of elemental configuration and arranged with domain-blocking sites, each of which is uniformly offset from an associated domain-holding location by less than one-half the spacing between adjacent locations. The register produces domain-blocking fields localized at these sites during each propagate step offset from the start of the propagate field by a time corresponding to the spatial offset. This time offset allows a domain to propagate in the desired direction past one block site, but no further.

The shift register operates by storing and propagating, for each unit of information being processed, a domain of reverse magnetization in an anisotropic magnetic film. The register moves the domain by the technique of domain tip propagation. According to this technique, a narrow channel of relatively low magnetic coercivity is formed in a body of anisotropic ferromagnetic material that otherwise has a relatively high magnetic conercivity. The magnetization of the body of material is saturated along the easy axis in a forward direction, and the channel extends longitudinal to this axis. A domain of reverse magnetization nucleated at an input point along the channel is propagated along the channel by a magneitc field smaller than the nucleating field but having the same polarity. U.S. Pat. No. 3,438,006, which describes one manufacture of the foregoing low-coercivity channel structure, describes AND, OR and like logic elements for processing information according to domain tip propagation, and U.S. Pat. No. 3,465,316 describes non-reciprocal, i.e. unidirectional, domain tip propagation devices. Further, U.S. Pat. Nos. 3,438,016 and 3,562,722 describe domain tip propagation shift registers that are considered to be prior art for the present invention.

Also, the copending and commonly-assigned U.S. patent application of Robert J. Spain for "Magnetic Thin Film Shift Register Having Bidirectional Transmission Elements And Alternately-Paired Block Sites" filed concurrently herewith i.e. on May 1, 1972, bearing Ser. No. 248,813 describes another construction for a domain tip propagation shift register of the present type. The copending and commonly-assigned U.S. patent application of Robert J. Spain and Harvey I. Jauvtis for "Multiplexing Systems For Thin Film Magnetic Propagation Channels" filed concurrently herewith i.e. on May 1, 1972, bearing Ser. No. 248,813 describes a system for multiplexing shift registers of the present and like constructions.

An object of this invention is to provide a shift register of digital information represented by discrete regions of magnetization and which has a bidirectional and generally lineal transmission path for the magnetic regions.

Another object of the invention is to provide a shift register of digital information represented by discrete regions of magnetization and which operates with positive inhibiting of domain propagation beyond prescribed locations.

A further object of the invention is to provide a shift register of the above character which operates with magnetic fields directed along a single axis.

It is also an object of the invention to provide a magnetic thin film shift register of the above character that employs a geometrically simple configuration of domain-blocking fields, and operates with a relatively simple sequence of steps.

A further object of the invention is to provide a shift register of the above character capable of reliable operation with magnetic fields having relatively wide magnitude tolerances.

Another object of the invention is to provide a construction for a shift register of the above character which can be fabricated with relatively high information density.

Other objects of the invention will in part be obvious and will in part appear hereinafter.

SUMMARY OF THE INVENTION

A shift register according to the invention has a bidirectional magnetic domain transmission path with serially arranged and alternately energized domain-holding locations interleaved with concurrently energized domain-blocking sites. The shift register operates on a step-by-step basis in which an information-bearing domain in a first hold location is shifted past one block site and up to the next block site, to occupy the next hold location, during each step.

In a typical embodiment of the invention, a first current conductor alternately subjects the transmission path to a domain-propagating field and to an erase field of opposite polarity. A second current conductor subjects alternate hold locations to a localized, domain-preserving hold field at alternate times. One or the other of the hold fields is produced simultaneously with the erase field to preserve information-bearing domains at a corresponding one of the two sets of alternate hold locations during the erasure of reverse magnetization domains from elsewhere along the shift register path.

The shift register also has means for producing block fields that restrict domain propagation in response to the drive field. Like the hold fields, the block fields are localized. One block field site is provided along the path between each pair of adjacent hold locations, and is located less than one-half way from one hold location to the next hold location along the path in the forward direction. The block fields are produced with each propagate field, but are delayed from the start of the propagate field. The delay is sufficient to allow a domain at a hold location to propagate forward along the path past the adjacent block site. However, the delay is sufficiently short to preclude a domain at a hold location from expanding backward along the path beyond the immediately preceding block site, and to preclude a domain from propagating forward past a second block site.

This arrangement of the block sites, and timing of the block fields relative to the propagate field, constrains each domain in the shift register path to propagate forward along the path by only one hold location during each propagate step. The block fields provide positive inhibition of further forward propagation, and of backward propagation to a preceding hold location. This operation has little dependence on geometrically-induced properties of the transmission path, and is realized with uni-axial magnetic fields. Also, the register operates with a simple sequence of magnetic fields, which enables the field-producing current sources and the sequence-controlling unit to have relatively simple and hence low-cost constructions.

Further, the invention makes it possible for the shift register to have a simple, straight-line transmission path that can be manufactured readily with high yield and hence at relatively low cost. Similarly, the field-producing conductors can have relatively simple geometries. Also, a shift register constructed to operate in the foregoing manner can have relatively high information density.

Moreover a shift register according to the invention can shift domains backward along the path, in addition to the forward shifting discussed above.

Thus, the net effect of the present arrangement for a magnetic domain shift register is that the device is comparatively small and of geometrically-simple construction, and hence is free of many of the restrictions and critical manufacturing and operating specifications attendant with the prior art.

The invention accordingly comprises the features of construction, combinations of elements, and arrangement of parts exemplified in the constructions hereinafter set forth, and the scope of the invention is indicated in the claims.

BRIEF DESCRIPTION OF DRAWINGS

For a fuller understanding of the nature and objects of the invention, reference should be made to the following detailed description and accompanying drawings, in which.

DESCRIPTION OF ILLUSTRATED EMBODIMENTS

Figure 1:
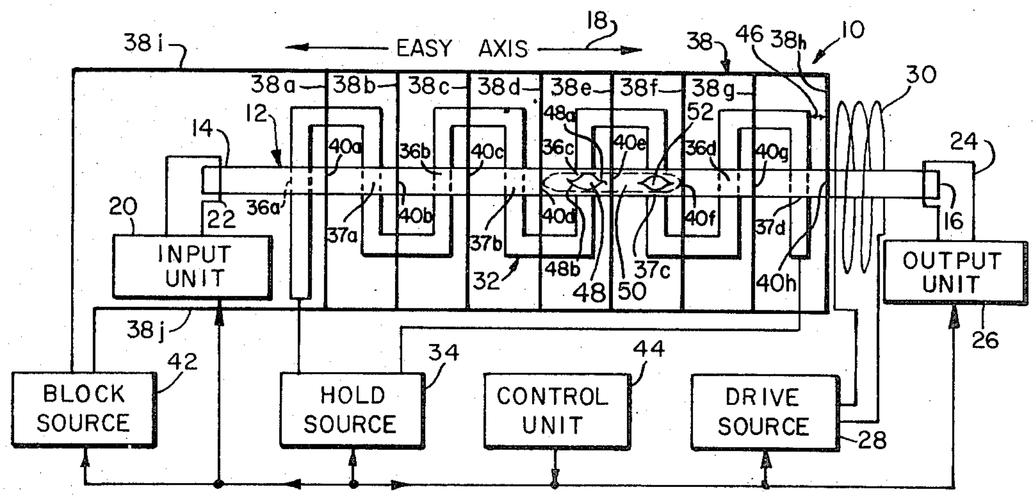
FIG. 1 is a schematic representation of a shift register according to the ivention.

FIG. 1 shows a multiple stage shift register 10 embodying the invention and having a signal path 12 extending from an input port 14 to an output port 16. The signal path is a channel of a low coercivity magnetic material bounded along its sides by high coercivity magnetic material. Both materials are magnetically anisotropic with an easy axis oriented along arrow 18. The magnetization of the high coercivity material, and similarly that of the low coercivity material forming the path 12, are initially saturated along the easy axis in a forward direction, which extends from left to right in FIG. 1.

An input unit 20 is connected to a field-producing nucleate element illustrated as a write wire 22 crossing the path 12 at the input port. Direct current in the write wire from the input unit 20 produces a magnetic field in the reverse direction, i.e. from right to left, of sufficient strength to nucleate a domain of reverse magnetization in the path 12 at the input port. Similarly, at the output port 16, a field-sensing element in the form of a read wire 24 inductively coupled to the path is connected to signal an output unit 26 when a domain of reverse magnetization advances to the output port along the path 12.

With further reference to FIG. 1, an electrical source 28 of drive current is connected to a drive conductor 30 arranged to impose a magnetic drive field along the entire path 12 and oriented along the easy axis 18. A drive field directed from right to left in FIG. 1 is termed a propagate field, and an oppositely-directed drive field is termed an erase field. The propagate field has sufficient magnitude to expand domains already present in the path 12, but insufficient to nucleate domains. The erase field has sufficient magnitude to erase domains from the shift register path. The drive conductor 30 typically is a solenoid-like winding extending along the entire length of path 12.

As also shown in FIG. 1, a hold conductor 32 connected to a hold source 34 of direct electrical current threads back and forth across the path 12. The hold conductor couples a magnetic hold field into each portion of the path 12 which it traverses. The hold field is oriented along the easy axis 18 and has a magnitude substantially equal to the erase field to cancel it when of opposite polarity and thereby prevent domain erasure. The polarity of the current which source 34 applies to the hold conductor, and the direction with which the hold conductor crosses the path, determine the polarity of the hold field.

Each portion of path 12 which the hold conductor crosses is termed a hold location. The illustrated register path has eight hold locations, A hold locations 36*a*, 36*b*, 36*c* and 36*d* alternately located with B hold locations 37*a*, 37*b*, 37*c* and 37*d*. The hold conductor crosses the A locations 36 in one direction and crosses the B locations 37 in the opposite direction.

The shift register 10 further has a block conductor 38 that crosses the path 12 just past each hold location 36 and 37, in the direction of forward domain movement from the input port to the output port, to define block sites 40. The block conductor carries current across the path 12 at each block site in the same direction relative to the polarity of reverse magnetization to produce block fields having the same relative polarity. The block conductor 38 illustrated in FIG. 1 provides this operation by having segments 38*a*, 38*b* . . . 38*h*, each of which crosses the path 12 to provide a different block site, and which are energized in parallel from a block source 42 of direct current by way of two interconnections 38*i* and 38*j*. During operation of the block source, each block conductor segment carries current in the direction that produces a magnetic field along the easy axis 18 with a polarity that negates the propagation field at that site and hence blocks domain growth.

As indicated in FIG. 1, each block site 40 is located along the path 12 spaced in the foward direction from the preceding hold location 36 or 37 by an offset 46 significantly less than one-half the minimum spacing along the transmission path between adjacent hold locations. The offset 46, which is preferably uniform throughout the shift register 10, preferably is at lest as small as one-fourth or one-third of the inter-location spacing along the path 12.

Each block site is denominated as being associated with the hold location from which it is offset. Hence a site 40a is associated with hold location 36*a*, and location 37a has a block site 40*b* associated with it.

The shift register 10 can be constructed with the path 12 and with the hold conductor 32 and the block conductor segments 38*a* through 38*h* having the geometrical configuration shown in FIG. 1. The path 12 is generally ribbon-like, and the hold conductor 32 and the block conductor segments disposed in planes different from the plane of the path but sufficiently close to the path to couple the desired magnetic fields into the path. The block conductor interconnections 38*i* and 38*j* are physically removed from the path 12 so that the magnetic fields which result from current therein do not couple significantly with the transmission path 12.

The shift register 10 also includes a control unit 44 that operates the input unit 20, the output unit 26, and the sources 28, 34 and 42. The control unit can be constructed with conventional skills with known logic and timing circuits to provide the shift register operation detailed below with reference to FIGS. 2 and 3.

As indicated above, the register 10 stores and shifts binary digital information in the form of discrete domains of reverse magnetization. A binary ONE is usually represented by a domain reverse magnetization, and a binary ZERO by the absence of a domain. In essence, the shift register operates by moving a domain along the path 12 from one hold location to the next, and then on to the succeeding hold location, in each cycle of operation.

Figure 2:
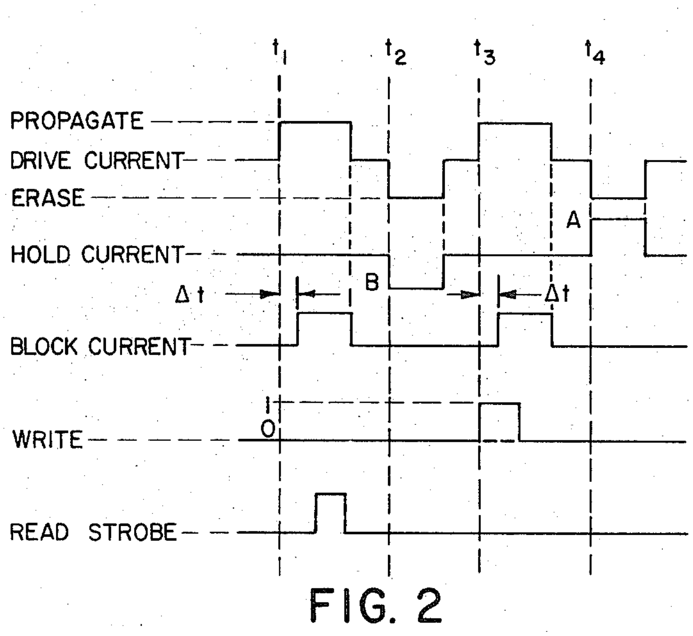
FIG. 2 is a timing chart illustrating the operation of the shift register of FIG. 1.

With reference to FIG. 2, in the first step of the illustrated operating cycle, the drive source 28 applies current to the drive conductor 30 to produce a propagate field starting at time *t*1. After a delay of time $\Delta t$, typically a small fraction of a microsecond, the block source 42 applies current to the block conductor 38 to produce a block field at each block site. The block fields then remain present for at least as long as the propagate field, as indicated in FIG. 2.

The delay time $\Delta t$ is longer than the maximum time required for a domain to expand forward, i.e. propagate, from a hold location past the associated block site. However, it is less than the minimum time required for a domain to expand back along the path 12 from a hold location to the preceding block site. The register preferably is configured so that there is a significant difference between these times, and the delay time ideally is equal to one-half the difference between them.

The propagate field produced starting at time *t*1 expands any domain present at a hold location along the path 12. After the $\Delta t$ delay, a domain which was at a hold location has expanded forward across the associated block site. The subsequent onset of the block field blocks propagation of the domain foward beyond the block site associated with the next hold location, and it blocks propagation of the domain backward along the path beyond the block site which precedes the hold location where the domain was present immediately prior to time *t*1.

Thus, prior to termination of the propagate and block fields produced between times *t*1 and *t*2, a reverse domain is present in every hold location that initially had a reverse domain and in the next hold location along the path. However the initially-present domains have not expanded further along the path 12, since they are blocked in both directions.

By way of a specific example of the operation of the shift register 10 during the first propagate step, which occurs between the times *t*1 and *t*2 shown in FIG. 2, consider a domain 48 present in the shift register 10 at location 36*c* immediately prior to time *t*1. Within the interval $\Delta t$ after time *t*1, i.e. prior to the onset of the block field, the propagate field has expanded the domain so that its forward tip 48*a* is beyond the associated block site 40*e*. However, the domain back tip 48*b* has not yet reached the preceding block site 40*d*. After application of the block field, but prior to termination of the propagate and block fields, the domain forward end expands beyond the next hold location 37*c* until it is stopped at the next block site 40*f*. Also, block site 40*d* blocks the domain back end from reaching the preceding hold location 37*d*. This expanded domain now occupies the portion 50 of path 12. The next step of the operating cycle will reduce the domain to the localized shape 52 at hold location 37*c*.

With further reference to FIG. 2, after termination of the first-step propagate field, the domains remain stationary in the path 12 until the next step in the operating cycle. This step commences at time *t*2 with the drive source 28 energizing the drive conductor 30 to produce an erase field, at the same time that the hold source 34 energizes the hold conductor 32 to produce a hold B field. The erase field tends to erase or destroy all domains of reverse magnetization from the path 12, but the hold B field produced at this time opposes the erase field at all B hold locations 37. Thus, upon termination of the erase and hold fields that commenced at time t2, the shift register path can store domains only at B hold locations 37.

The illustrated operating cycle continues with the production at time *t*3 of another propagate field and a block field commencing a time $\Delta t$ thereafter. These fields extend each reverse magnetization domain in the path 12 at a hold location forward to the next hold location. As in the first propagate step, current in the block conductor segments produces localized block fields that prevent domain expansion from any location back along the path to a preceding hold location and forward along the path beyond the next location.

The operating cycle continues with a second erase and hold operation commencing at time *t*4. As shown in FIG. 2, at this time the hold conductor 32 produces a hold A field with a polarity to prevent erasure of domains from the A hold locations 36 of the path 12. The polarity of this hold field is opposite to the polarity of the B hold field produced in the *t*2–*t*3 interval.

For utmost reliability in the shift register operation, it is preferred that each block field continue for at least as long as the concurrent propagate field, and that each hold field be present at least as long as the simultaneous erase field. Also, by way of example, for a shift register as shown in FIG. 1 and having a 0.007 inch wide hold conductor 32 cross the path at 0.014 inch spacings center-to-center, each propagate field can be present for a minimum time in the order of 0.5 microsecond, and each erase field can be as brief as 0.5 microsecond.

As further shown in FIG. 2 with the "write" waveform, when a ZERO is to be written into the shift register 10, no action is taken; whereas when a ONE is to be written, the input unit 20 applies a write pulse to the write wire 22 to nucleate a domain of reverse magnetization at the input port 14. The write operation preferably occurs during application of the propagate field to reduce the write ONE field that is required to nucleate a domain inasmuch as the two fields have the same polarity. However, the write operation can precede the propagate step.

The output unit 26 is strobed to sense the arrival of a ONE-identifying domain at the shift register output port 16 during one propagate and block operation of each cycle. The timing of the read strobe pulse during this propagate step depends on the distance a domain must travel from the last hold location 37d in the register to the output port 16. This distance is fixed for a given shift register construction, and hence the timing of the read strobe in uniform for all cycles.

The operating cycle of FIG. 2 shows the write step as occurring during the second propagate step of each cycle, i.e. during the $t3$–$t4$ interval, and with the read operation occurring the first propagate step, i.e. during the $t1$–$t2$ interval. However, the write-read sequence in each cycle can be reversed, and for the operation illustrated in FIG. 2 can be reversed by also reversing the polarity of the hold currents so that the hold A field occurs beginning at time t2 and the hold B field commences beginning at time $t4$.

Figure 3:
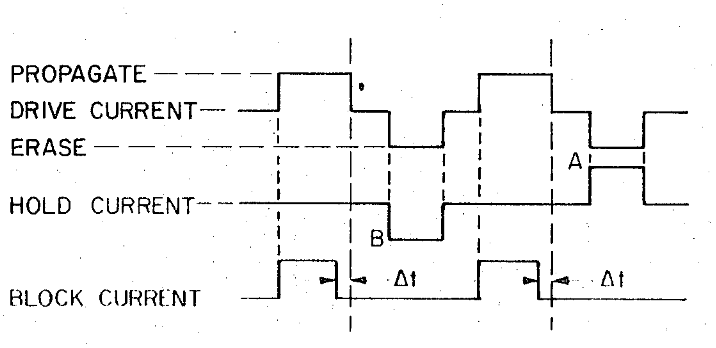
FIG. 3 is a timing chart for providing reverse-direction shifting with the register of FIG. 1.

Although described so far as shifting domains in a forward direction and with each block site offset in this direction from its associated hold location, a shift register according to the invention can shift domains in the opposite, reverse direction with no charge in structure. This will now be described with reference to the same register 10 of FIG. 1 and the timing diagram of FIG. 3. The operating cycle of FIG. 3 is identical to that of FIG. 2 except that each block field commences no later than the propagate field, but the block field terminates at a time $\Delta t$ prior to termination of the propagate field. With this timing of the propagate and block fields, during the first propagate step (commencing at time $t1$) a domain such as domain 48 in FIG. 1 initially is blocked from expanding forward, e.g. at its end 48*a*, by the associated block field. However, the domain can expand at its back end, e.g. 48*b*, until it reaches the preceding block site, e.g. site 40*d*, where it is blocked. Upon termination of the block field $\Delta t$ prior to the propagate field, both ends of the domain can expand along the path 12 for the time $\Delta t$. This time is sufficient for the domain back end to expand past the preceding block site to the preceding hold location, thereby achieving "backward" shifting. The time $\Delta t$ is insufficient, however, for the domain forward end to propagate to the next forward hold location.

The FIG. 3 reverse-shifting cycle proceeds next to an erase and hold step, and then provides a second propagate step wherein the block field is present except at the final interval of time $\Delta t$. The cycle ends with a second erase and hold step.

It will now be appreciated that the shift register 10 of FIG. 1 can where desired be operated to step domains back and forth along the path 12 by combining the operations of FIGS. 2 and 3.

Figure 4:
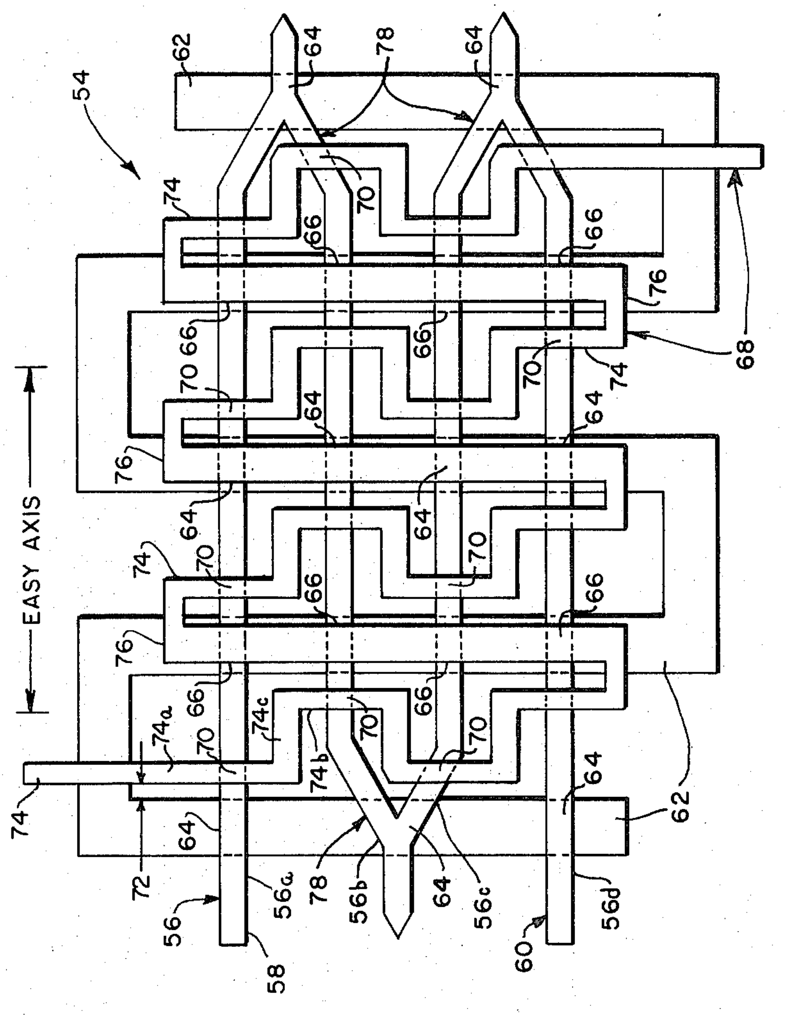
FIG. 4 is a schematic representation of a preferred configuration for a shift register embodying the invention.

FIG. 4 shows a shift register 54 that employs a preferred construction for applying the shift register arrangement of FIG. 1 to large capacity devices. The register 54 has a domain transmission path 56 that is folded to have four interconnected side-by-side legs 56*a*, 56*b*, 56*c* and 56*d* extending longitudinal to the magnetization easy axis between an input port 58 and an output port 60. The register 54 is shown as having four legs for simplicity; the transmission path 56 can have more legs and each leg can be longer than shown to accommodate more hold locations and block sites.

The hold conductor 62 of the register 54 is of the same configuration as the hold conductor 32 in FIG. 1 to thread across all four transmission path legs. Adjacent hold conductor 62 crossings of the path are in opposite directions, as is the case in the register 10 of FIG. 1. Accordingly, the intersections of the hold conductor 64 with the transmission path 56 provide an alternate succession of hold A locations 64 and hold B locations 66.

The block conductor 68 of the FIG. 4 shift register is configured to provide, for each hold location, a block site 70 offset from the associated hold location 64 or 66 in the forward direction along the path by a distance 72. In particular, the block conductor 68 has an alternate series succession of block conductor segments 74 and interconnections 76. The interconnections are, as illustrated, straight conductors that pass across the transmission path legs centered over the hold conductor passings. The block conductor interconnections provide return paths for the block conductor current so that all block conductor segments 74 can cross the transmission path legs in the same direction and to enable the block conductor nevertheless to be formed as a single series conductor, rather than in the segment-parallel arrangement shown in FIG. 1. The current in the interconnecting portions of the block conductor is in the direction which produces magnetic fields that augment the propagation field, and hence the fields of the return current do not detract from the shift register operation. However, it is considered preferable, to ensure reliable operation, that the effect of the field of the return block current in interconnections 78 be minimized. Accordingly, the magnitude of the block current is controlled and the interconnections 76 are, as shown, made wider than the segments 74 to reduce the density of the field of the return block current.

Each block conductor segment 74 has a squarewave-like serpentine configuration to cross successive transmission path legs at the desired block sites 70. For example, the leftmost segment 74 in FIG. 4 has a portion 74*a* that crosses leg 56*a* offset to the right from the first hold A location 64 along the transmission path from the input port 58. This leftmost segment 74 also has a portion 74*b* that crosses the path leg 56*b* offset to the left from a hold B location 66 therein. A portion 74*c* of the leftmost segment 74 interconnects these two portions 74*a* and 74*b* at the desired offset block sites. As discussed above with reference to FIG. 1, the offset distance 72 of the FIG. 4 register preferably is small compared to the minimum inter-location spacing along path 56, and is at least less than one-half the inter-location spacing.

With further reference to FIG. 4, each portion 78 of path 56 interconnecting two legs has preferably a Y-like configuration with each branch of the Y connected to one path leg. The hold conductor crosses the juncture between the branches and with the stem of the Y configuration to form a hold location in this interconnecting portion of the path. Each path interconnecting portion 78 alternatively can be formed with a V configuration simply by omitting the stem of each illustrated Y configuration; however the V-configured interconnection requires a higher propagate field than otherwise to expand a reverse domain through it between the two interconnected path legs.

The shift register 54 can be operated with timing cycles as shown in FIGS. 2 and 3 and operates in the same manner as described above with reference to FIG. 1.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Magnetic logic apparatus for operation as a shift register of binary information, said apparatus comprising A. a magnetic domain tip propagation transmission path extending in a forward direction from an input port to an output port, said path being arranged with an alternate succession of spaced-apart first locations and second locations, and a block site associated with each location and disposed forward of the associated location by less than one-half the minimum spacing between adjacent locations, B. means for producing a first magnetic field for propagating magnetic domains along said path, C. means for producing a second magnetic field for removing magnetic domains from said path except at said first locations, and for producing a third magnetic field for removing magnetic domains from said path except at said second locations, and D. means for producing a domain propagation-blocking fourth magnetic field at each block site.

2. Magnetic logic apparatus as defined in claim 1 further comprising control means for operating said field producing means to produce said first field and, after a selected time delay, to produce said fourth field to continue at least for as long as said first field.

3. Magnetic logic apparatus as defined in claim 2 in which said control means operates said field producing means in a cycle successively to produce said first and fourth fields to propagate domains forward along said path by only one location, to produce said second field, to produce said first and fourth magnetic fields again to propagate magnetic domains forward along said path by only one location, and to produce said third magnetic field.

4. Magnetic logic apparatus as defined in claim 1 further comprising control means for operating said field producing means to produce said fourth field throughout the production of said first field except for an offset time corresponding to the average of the times requires for a domain to expand from a location to the next adjacent block sites in both directions along said path with said first field present.

5. Magnetic logic apparatus as defined in claim 1 further comprising control means for operating said field producing means to produce said fourth field throughout the production of said first field except for a selected time immediately preceding termination of said first field, said selected time corresponding to the time required for a domain to expand along said path between a block site and the associated hold location with said first field present.

6. Magnetic logic apparatus as defined in claim 1 in which

A. said transmission path extends substantially longitudinal to a first axis,

B. said means for producing said first magnetic field includes at least a first current conductor that produces said first magnetic field directed longitudinal to said first axis, and C. said means for producing said second and third magnetic fields includes said first current conductor and a second current conductor weaving back and forth across said path transverse to said first axis to produce at each location a magnetic field directed along said first axis, said magnetic fields of said second current conductor being directed at said first locations opposite to the direction thereof at said second locations.

7. Magnetic logic apparatus as defined in claim 6 in which said means for producing said fourth magnetic field includes a third current conductive structure having current conducting portions crossing said path transversely to said first axis for producing said fourth field in opposition to said first field at each said block site.

8. In a magnetic domain tip propagation shift register having a domain path with alternate serially-arranged first locations and second locations and extending in a forward direction from an input port to an output port and having means for propagating domains along said path and for erasing domains from said path except at selected locations, the improvement comprising A. block conductors transversely crossing said path for producing domain propagation-blocking magnetic fields therein, said block conductors producing said propagation-blocking fields localized at block sites, one of which is located along said path forward of each location by a distance less than one-half the inter-location spacing, and B. means for energizing said block conductors to produce said blocking fields at a selected time after initiation of each propagation of domains along said path, said time being longer than the time required for domains to propagate forward from a location to beyond the first adjacent block site and being shorter than the time required for domains to propagate backward from a lcoation to beyond the first adjacent block site in that direction.

9. Magnetic logic apparatus for operation as a shift register of binary information, said apparatus comprising A. a magnetic domain tip propagation transmission path extending between first and second terminal ports, said path being arranged with an alternate succession of first and second domain-holding locations, and a block site associated with each location and spatially offset therefrom in a first direction along said path by less than one-half the minimum spacing between adjacent locations, B. means for producing a first magnetic field for propagating magnetic domains along said path, C. means for producing a second magnetic field for removing magnetic domains from said path except at said first locations, and for producing a third magnetic field for removing domains from said path except at said second locations, D. means for producing a domain propagation-blocking fourth magnetic field at each block site, and E. control means for operating said field-producing means to produce said fourth field throughout the production of said first field except for an offset time corresponding to the average of the times required for a domain to expand from a location to the next adjacent block sites in both directions along said path.

10. Magnetic logic apparatus as defined in claim 1 in which

A. said means for producing said first magneitc field includes a first current conductor positioned relative to said transmission path for producing said first magnetic field longitudinal to the forward direction of said transmission path, and B. said means for producing said second and third fields includes said first current conductor and a second current conductor disposed relative to said transmission path for producing a magnetic field longitudinal to the field of said first conductor and with the polarity thereof at said first locations being opposite to the polarity thereof at said second locations.

11. Magnetic logic apparatus as defined in claim 10 further comprising

A. a first current source for applying current to said first current conductor to produce said first field, and B. a second current source for applying current to said second conductor with a selected one of two polarities.

12. Magnetic logic apparatus as defined in claim 1 further comprising control means for operating said field producing means to produce said fourth field throughout the production of said first field except for a selected offset time after initiation of said first field, said selected time being greater than the time required for a domain to expand, with said first field present, forward along said path from a location past the associated block site, and being less than the time required for a domain to expand, with said first field present, backward along said path from a location to the block site associated with the preceding location.

13. Magnetic logic apparatus as defined in claim 1 further comprising control means operating said field producing means to produce said fourth field throughout the production of said first field except for a selected time immediately preceding termination of said first field, said selected time being greater than the time required for a domain to expand, with said first field present, backward along said path from a location to the block site associated with the preceding location, and less than the time required for a domain to expand, with said first field present, forward along said path from a location to the next location.

* * * * *

UNITED STATES PATENT OFFICE

CERTIFICATE OF CORRECTION

Patent No. 3,786,449 Dated January 15, 1974

Inventor(s) Harvey I. Jauvtis

It is certified that error appears in the above-identified patent and that said Letters Patent are hereby corrected as shown below:

In the Abstract, line 3, change "palth" to --path--.

Column 1, line 28, change "conercivity" to --coercivity--.

Column 1, line 33, change "magneitc" to --magnetic--.

Column 5, line 22, after "by a domain" insert --of--.

Column 6, line 12, change "37d" to --37b--.

Column 7, line 9, before "uniform", "in" should be --is--.

Column 7, line 13, after "occurring" insert --during--.

Column 7, line 24, change "charge" to --change--.

Column 9, line 55, "requires" should be --required--.

Column 11, line 13, "magneitc" should be --magnetic--.

Column 12, line 18, after "control means" insert --for--.

Signed and sealed this 29th day of October 1974.

(SEAL)
Attest:

McCOY M. GIBSON JR.
Attesting Officer

C. MARSHALL DANN
Commissioner of Patents